US008306273B1

(12) United States Patent
Gravseth et al.

(10) Patent No.: US 8,306,273 B1
(45) Date of Patent: Nov. 6, 2012

(54) METHOD AND APPARATUS FOR LIDAR TARGET IDENTIFICATION AND POSE ESTIMATION

(75) Inventors: Ian J. Gravseth, Longmont, CO (US); Jeffrey J. Bladt, Longmont, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 426 days.

(21) Appl. No.: 12/647,883

(22) Filed: Dec. 28, 2009

(51) Int. Cl.
*G06K 9/00* (2006.01)

(52) U.S. Cl. ........................................ 382/106
(58) Field of Classification Search ............... 382/106, 382/154; 244/158.4; 250/208.1; 356/4.01, 356/501
See application file for complete search history.

(56) References Cited

U.S. PATENT DOCUMENTS

| | | | |
|---|---|---|---|
| 4,022,532 A | 5/1977 | Montagnino | |
| 4,201,468 A | 5/1980 | Margolis et al. | |
| 4,730,320 A | 3/1988 | Hidaka et al. | |
| 5,029,023 A | 7/1991 | Bearden et al. | |
| 5,091,778 A | 2/1992 | Keeler | |
| 5,192,978 A | 3/1993 | Keeler | |
| 5,317,376 A | 5/1994 | Amzajerdian et al. | |
| 5,345,304 A | 9/1994 | Allen | |
| 5,357,371 A | 10/1994 | Minott | |
| 5,485,009 A | 1/1996 | Meyzonnetie et al. | |
| 5,682,225 A | 10/1997 | DuBois et al. | |
| 5,682,229 A | 10/1997 | Wangler | |
| 5,784,023 A | 7/1998 | Bluege | |
| 5,793,034 A | 8/1998 | Wesolowicz et al. | |
| 5,815,250 A | 9/1998 | Thomson et al. | |
| 5,847,816 A | 12/1998 | Zediker et al. | |
| 5,870,180 A | 2/1999 | Wangler | |
| 5,870,181 A | 2/1999 | Andressen | |
| 5,914,776 A | 6/1999 | Streicher | |

(Continued)

FOREIGN PATENT DOCUMENTS

GB    2300325    10/1996

(Continued)

OTHER PUBLICATIONS

Notice of Allowance and Fee(s) Due for U.S. Appl. No. 12/357,171, mailed Dec. 6, 2011, 32 pages.

(Continued)

*Primary Examiner* — Vu Le
*Assistant Examiner* — Amara Abdi
(74) *Attorney, Agent, or Firm* — Sheridan Ross P.C.

(57) ABSTRACT

The present invention pertains to the identification of a set of measurement data, using an a priori model database, which is then used in the determination of a pose solution using LADAR data. In particular, a model database of a target scene is created. The model database includes location information for a plurality of points within the target scene, and separation distances between sets of those points defining triangles. LADAR data obtained from a target scene is processed to extract features. Location information and separation distances between sets of extracted features defining triangles are placed in a measurement database. Separation distances contained in the measurement database are compared to separation distances contained in the model database. If a match is found, a rotation quaternion and translation vector are calculated, to transform the data in the measurement database into the frame of reference of the data in the model database. The rotation quaternion and translation vector can be applied to additional sets of data defining additional triangles, to verify that the target scene has been correctly identified. A pose solution and range can then be output.

18 Claims, 8 Drawing Sheets

U.S. PATENT DOCUMENTS

| | | | |
|---|---|---|---|
| 5,917,596 | A | 6/1999 | Jenkins et al. |
| 5,923,466 | A | 7/1999 | Krause et al. |
| 6,034,770 | A | 3/2000 | Kim et al. |
| 6,173,066 | B1 | 1/2001 | Peurach et al. |
| 6,323,941 | B1 | 11/2001 | Evans et al. |
| 6,411,871 | B1 | 6/2002 | Lin |
| 6,414,746 | B1 | 7/2002 | Stettner et al. |
| 6,434,211 | B1 | 8/2002 | Lloyd et al. |
| 6,448,572 | B1 | 9/2002 | Tennant et al. |
| 6,542,831 | B1 | 4/2003 | Moosmuller et al. |
| 6,608,669 | B2 | 8/2003 | Holton |
| 6,646,725 | B1 | 11/2003 | Eichinger et al. |
| 6,657,733 | B1 | 12/2003 | Drake |
| 6,664,529 | B2 | 12/2003 | Pack et al. |
| 6,665,063 | B2 | 12/2003 | Jamieson et al. |
| 6,747,258 | B2 | 6/2004 | Benz et al. |
| 6,804,607 | B1 | 10/2004 | Wood |
| 6,943,868 | B2 | 9/2005 | Haig |
| 6,972,887 | B2 | 12/2005 | Wickham et al. |
| 7,006,203 | B1 | 2/2006 | Book et al. |
| 7,095,488 | B2 * | 8/2006 | Jamieson et al. ............ 356/5.01 |
| 7,113,886 | B2 | 9/2006 | West |
| 7,142,981 | B2 | 11/2006 | Hablani |
| 7,224,466 | B2 | 5/2007 | Ray |
| 7,224,707 | B2 | 5/2007 | Gendron |
| 7,236,235 | B2 | 6/2007 | Dimsdale |
| 7,240,879 | B1 | 7/2007 | Cepollina et al. |
| 7,277,641 | B1 | 10/2007 | Gleckman |
| 7,342,228 | B1 | 3/2008 | O'Connell et al. |
| 7,345,743 | B1 | 3/2008 | Hartman et al. |
| 7,359,057 | B2 | 4/2008 | Schwiesow |
| 7,397,568 | B2 | 7/2008 | Bryce et al. |
| 7,406,220 | B1 | 7/2008 | Christensen et al. |
| 7,436,494 | B1 | 10/2008 | Kennedy et al. |
| 7,453,552 | B1 | 11/2008 | Miesak |
| 7,580,132 | B2 | 8/2009 | Baillon et al. |
| 2002/0117340 | A1 | 8/2002 | Stettner |
| 2003/0063884 | A1 | 4/2003 | Smith et al. |
| 2004/0021852 | A1 | 2/2004 | DeFlumere |
| 2004/0119838 | A1 | 6/2004 | Griffis et al. |
| 2004/0130702 | A1 | 7/2004 | Jupp et al. |
| 2004/0213463 | A1 | 10/2004 | Morrison |
| 2005/0060092 | A1 | 3/2005 | Hablani |
| 2005/0099634 | A1 | 5/2005 | Dubois et al. |
| 2006/0088946 | A1 | 4/2006 | Willson et al. |
| 2006/0114447 | A1 | 6/2006 | Harris et al. |
| 2006/0132752 | A1 | 6/2006 | Kane |
| 2006/0136172 | A1 | 6/2006 | O'Kane et al. |
| 2006/0197936 | A1 | 9/2006 | Liebman et al. |
| 2007/0073486 | A1 | 3/2007 | Tillotson et al. |
| 2007/0110364 | A1 | 5/2007 | Rice et al. |
| 2007/0115541 | A1 | 5/2007 | Rogers et al. |
| 2007/0122001 | A1 | 5/2007 | Wang et al. |
| 2007/0171407 | A1 | 7/2007 | Cole et al. |
| 2007/0263676 | A1 | 11/2007 | Beukema et al. |
| 2008/0023587 | A1 | 1/2008 | Head et al. |
| 2008/0136626 | A1 | 6/2008 | Hudson et al. |
| 2008/0212328 | A1 | 9/2008 | Minano et al. |
| 2008/0273560 | A1 | 11/2008 | Stelmakh |
| 2008/0290259 | A1 | 11/2008 | Mathewson et al. |
| 2008/0316498 | A1 | 12/2008 | Drake et al. |
| 2009/0002680 | A1 | 1/2009 | Ruff et al. |
| 2009/0046289 | A1 | 2/2009 | Caldwell et al. |
| 2009/0059201 | A1 | 3/2009 | Willner et al. |
| 2009/0110267 | A1 * | 4/2009 | Zakhor et al. ................ 382/154 |
| 2009/0115994 | A1 | 5/2009 | Stettner et al. |
| 2009/0142066 | A1 | 6/2009 | Leclair et al. |
| 2009/0237640 | A1 | 9/2009 | Krikorian et al. |
| 2009/0273770 | A1 | 11/2009 | Bauhahn et al. |
| 2009/0310118 | A1 | 12/2009 | Halldorsson |
| 2010/0165323 | A1 | 7/2010 | Fiess et al. |

FOREIGN PATENT DOCUMENTS

| | | |
|---|---|---|
| GB | 2306828 | 5/1997 |
| GB | 2364840 | 2/2002 |
| WO | WO 02/04982 | 1/2002 |
| WO | WO 02/065155 | 8/2002 |
| WO | WO 2007/081628 | 7/2007 |
| WO | WO 2009/133414 | 11/2009 |

OTHER PUBLICATIONS

International Search Report and Written Opinion for International Application No. PCT/US2010/033559, mailed Jul. 6, 2010, 9 pages.

International Preliminary Report on Patentability for International Application No. PCT/US2010/033559, mailed Nov. 24, 2011, 8 pages.

Notice of Allowance and Fee(s) Due for U.S. Appl. No. 12/464,009, mailed Jan. 31, 2011, 10 pages.

Restriction Requirement for U.S. Appl. No. 13/341,640, mailed Mar. 7, 2012, 6 pages.

International Search Report and Written Opinion for International Patent Application Serial No. PCT/US11/46689, mailed Mar. 20, 2012, 15 pages.

International Preliminary Report on Patentability for International Patent Application Serial No. PCT/US2010/021213, mailed Aug. 4, 2011, 7 pages.

Official Action for U.S. Appl. No. 12/357,251, mailed Mar. 11, 2011, 23 pages.

Xun et al., "Expanding range of pulsed range sensors with active projection from spatial light modulators", Spaceborne Sensors III, Proc. of SPIE vol. 6220, 62200I, 2006, 9 pages.

Brian F. Aull et al., "Geiger-Mode Avalanche Photodiodes for Three-Dimensional Imaging", Lincoln Laboratory Journal, vol. 13, No. 2 (2002).

Didier Bruneau, "Mach-Zehnder Interferometer as a Spectral Analyzer for Molecular Doppler Wind Lidar", Applied Optics, vol. 40, No. 3, pp. 391-399 (2001).

Didier Bruneau and Jacques Pelon, "Simulation and Measurement of Particle Backscattering & Extinction Coefficient & Wind Velocity by Lidar with a Mach-Zehnder Interferometer: Principle of Operation & Performance Assessment", Applied Optics, vol. 42, No. 6, pp. 1101-1114 (2003).

Pierre Connes and Guy Michel, "Astronomical Fourier Spectrometer", Applied Optics, vol. 14, No. 9, pp. 2067-2084 (1975).

Degnan, John J., "Photon-Counting Multikilohertz Microlaser Altimeters for Airborne and Spaceborne Topographic Measurements", Journal of Geodynamics, vol. 34, pp. 503-549 (2002).

T.S. Durrani and C.A. Greated, "Spectral Analysis and Cross-Correlation Techniques for Photon Counting Measurements on Fluid Flows", Applied Optics, vol. 14, No. 3, pp. 778-794 (1975).

W.A. Gault, et al., "ERWIN: An E-Region Wind Interferometer", Applied Optics, vol. 35, No. 16, pp. 2913-2922 (1996).

Gentry, Bruce et al., "The Tropospheric Wind Lidar Technology Experiment (TWiLiTE): An Airborne Direct Detection Doppler Lidar Instrument Development Program", available at http://esto.nasa.gov/conferences/estc2006/papers/b8p2.pdf.

Pierre Jacquinot, "*The Luminosity of Spectrometers with Prisms, Gratings, or Fabry-Perot Etalons*", Journal of the Optical Society of America, vol. 44, No. 10, pp. 761-765 (1954).

V. Nirmal Kumar and D. Narayana Rao, "*Determination of the Instrument Function of a Grating Spectrometer by Using White-Light Interferometry*", Applied Optics, vol. 36, No. 19, pp. 4535-4539 (1997).

Lieber, Mike et al., "Development of a Validated End-to-End Model for Space-Based Lidar Systems", *Lidar Remote Sensing for Environmental Monitoring VIII* (Singh, Upendra N. ed.), Proceedings of the SPIE, vol. 6681, 66810F (2007).

Lieber, Mike et al., "System Verification of the JMEX Mission Residual Motion Requirements with Integrated Modeling", *UV/Optical/IR Space Telescopes: Innovative Technologies and Concepts II* (MacEwen, Howard A. ed.), Proceedings of the SPIE, vol. 5899, 589901, pp. 1-12 (2005).

Lieber, Mike et al., "Integrated System Modeling for Evaluating the Coronagraph Approach to Plant Detection", *High-Contrast Imaging for Exo-Planet Detection* (Schultz, Alfred B. ed.), Proceedings of the SPIE, vol. 4860 (2002). (Abstract only).

W.T. Mayo, Jr., "Photon Counting Processor for Laser Velocimetry", Applied Optics, vol. 16, No. 5, pp. 1157-1162 (1977).

G.A. Morton, "Photon Counting", Applied Optics, vol. 7, No. 1, pp. 1-10 (1968).

Rabinovich, W.S. et al., "45 Mbps Cat's Eye Modulating Retro-Reflector Link Over 7 Km", *Free-Space Laser Communications VI*, Proceedings of the SPIE, vol. 6304, pp. 63040Q (2006). (Abstract only).

Robert L. Richardson and Peter R. Griffiths, "Design and Performance Considerations of Cat's Eye Retroreflectors for Use in Open-Path Fourier-Transform-Infrared Spectrometry", Applied Optics, vol. 41, No. 30, pp. 6332-6340 (2002).

J. Ring and J.W. Schofield, "Field-Compensated Michelson Spectrometers", Applied Optics, vol. 11, No. 3, pp. 507-516 (1972).

Gordon G. Shepherd et al., "WAMDII: Wide-Angle Michelson Doppler Imaging Interferometer for Spacelab", Applied Optics, vol. 24, No. 11, pp. 1571-1584 (1985).

Gordon G. Shepherd et al., "WINDII—The Wind Imaging Interferometer for the Upper Atmosphere Research Satellite", Geophys. Res. vol. 98, No. D6, pp. 10,725-10,750 (1993).

Vallerga, John et al., "Noiseless, High Frame Rate (>KHz), Photon Counting Arrays for Use in the Optical to the Extreme UV", University of California, Berkeley—Sciences Laboratory and University of Geneva, Switzerland, available at http://www.ssl.berkeley.edu/~mcphate/AO/ao_medipix.html (2004-present).

Shiquang Wang, Gordon G. Sheperd, and William E. Ward, "Optimized Reflective Wide-Angle Michelson Phase-Stepping Interferometer", Applied Optics, vol. 39, No. 28, pp. 5147-5160, (2000).

Grund, et al. "Enabling Characteristics of Optical Autocovariance Lidar for Global Wind and Aerosol Profiling", AGU, American Geophysical Union, Fall Meeting, San Francisco, CA (Dec. 16, 2008).

Grund, Chris, "An Alternative Direct Detection Approach to Doppler Winds that is Independent of Aerosol Mixing Ratio and Transmitter Frequency Jitter", Space Winds Lidar Working Group, Miami, FL (Feb. 8, 2007).

Grund, Christian et al., "Optical Autocovariance Wind Lidar and Performance from LEO", 14th Coherent Laser Radar Conference, Snowmass, CO (Jul. 7, 2007).

Grund, Christian et al., "Supporting NOAA and NASA High-Performance Space-Based DWL Measurement Objectives with a Minimum Cost, Mass, Power, and Risk Approach Employing Optical Autocovariance Wind Lidar (OAWL)", Space Winds Lidar Working Group, Monterrey, CA (Feb. 6, 2008).

Grund, Christian, et al., Presentation Entitled "Simultaneous Profiling of Aerosol Optical Properties, Gas Chemistry, and Winds with Optical Autocovariance Lidar", 24th ILRC Conference (Jun. 23, 2008).

Chris Grund, "Lidar Wind Profiling from Geostationary Orbit Using Imaging Optical Autocovariance Interferometry", Space Winds Lidar Working Group, Snowmass, CO (Jul. 17, 2007).

Grund, et al., Poster and Paper Entitled "Optical Autocovariance Wind Lidar (OAWL) for Efficient Space-Based Direct-Detection High-Resolution Aerosol Backscatter Winds", International Laser Radar Conference, Boulder, CO (Jun. 24, 2008).

Grund et al., Poster Entitled "Optical Autocovariance Wind Lidar (OAWL) for Efficient Space-Based Direct-Detection High-Resolution Aerosol Backscatter Winds", presented at the Coherent Laser Radar Conference, Jul. 2007, presented at the Working Group on Space-based Lidar Winds, Feb. 2008, and presented at the International Laser Radar Conference, Boulder, CO, Jun. 23-27, 2008, 1 page.

Grund, Christian J., Power Point Presentation Entitled "Optical Autocovariance: Alternative Direct Detection Approach to Doppler Winds that is Independent of Aerosol Mixing Ratio and Transmitter Frequency Jitter", presented at the Working Group Conference on Space-Based Lidar Winds, Feb. 6-9, 2007, 12 pages.

Grund et al., Presentation Entitled "Optical Autocovariance Wind Lidar and Performance from LEO", presented at the Coherent Laser Radar Conference, Jul. 11, 2007, 30 pages.

Grund et al. "Simultaneous Profiling of Aerosol Optical Properties, Gas Chemistry, and Winds with Optical Autocovariance Lidar", Paper 1 of 2 presented at the 24th International Laser Radar Conference, Jun. 23-27, 2008, 5 pages.

Grund et al., "Optical Autocovariance Wind Lidar (OAWL) for Efficient Space-Based Direct-Detection High-Resolution Aerosol Backscatter Winds", Paper 2 of 2 presented at the 24th International Laser Radar Conference, Jun. 23-27, 2008, 5 pages.

International Search Report and Written Opinion for International Patent Application Serial No. PCT/US2010/021213, mailed Mar. 22, 2010, 8 pages.

Kasten, et al., "Fabrication and Characterization of Individually Addressable Vertical-Cavity Surface-Emitting Laser Arrays and Integrated VCSEL/PIN Detector Arrays", Proceedings of SPIE, vol. 6484, 64840C, 2007.

Aerius Photonics website, "Aerius NIR/SWIR Illuminators" product sheet, available at http://www.aeriusphotonics.com/datasheets.html, 2 pages (2009).

U.S. Appl. No. 12/857,354, filed Aug. 16, 2010.

Notice of Allowance and Fee(s) Due for U.S. Appl. No. 12/390,226, mailed Dec. 17, 2010, 23 pages.

Allen et al., "Full-Scale Testing and Platform Stabilization of a Scanning Lidar System for Planetary Landing", *Space Exploration Technologies* (Wolfgang Fink, ed.), Proceedings of SPIE, vol. 6960, pp. 696004-1-696004-10 (Mar. 2008).

Bakalski et al., "Real Time Processing Enables Fast 3D Imaging at Single Photon Level", *Laser Radar Technology and Applications XIII*, (Monte D. Turner, Gary W. Kamerman, ed.), Proceedings of the SPIE, vol. 6950, pp. 69500K-1-69500K-9 (Mar. 2008).

Baker et al., "Advanced Infrared Detectors for Multimode Active and Passive Imaging Applications" *Infrared Technologies and Applications XXXIV* (Bjorn F. Andresen, Gabor F. Fulop, and Paul R. Norton, ed.), Proceedings of the SPIE, vol. 6940, pp. 69402L-1-69402L-11 (May 2008).

Brady and Schwartz, "ALHAT System Architecture and Operational Concept", Aerospace Conference , 2007 IEEE, Big Sky, MT, IEEEAC Paper # 1570, Version 4, pp. 1-13 (2007).

Cho et al., "Real-Time 3D Ladar Imaging", 35th Applied Imagery and Patern Recognition Workshop, pp. 5 (2006).

Craig et al., "Processing 3D Flash Ladar Point-Clouds in Real-Time for Flight Applications", *Sensors and Systems for Space Applications* (Richard T. Howard and Robert D. Richards, ed.), Proceedings of SPIE, vol. 6555, pp. 65550D-1-65550D-9 (2007).

Dissly et al., "Flash LIDAR Systems for Planetary Exploration", American Astronomical Society, DPS Meeting, Presentation # 40, Ithaca, NY, Bulletin of the American Astronoimical Society, vol. 41, pp. 560 (Jan. 2009).

Fay et al., "Fusion of Multi-Sensor Pasive and Active 3D Imagery", *Enhanced and Synthetic Vision 2001* (Jacques G. Verly, ed.), Proceedings of SPIE, vol. 4363, pp. 219-230 (2001).

Gillula, "Data Fusion From Multiple Sensors: Real-Time Mapping on an Unmanned Ground Vehicle", 2005 SURF Final Report, California Institute of Technology, 13 pgs (2005).

Habbit et al., "Utilization of Flash LADAR for Cooperative and Uncooperative Rendezvous and Capture", Space Systems Technology and Operations (Peter Tchoryk, Jr. and James Shoemaker, ed.), Proceedings of SPIE, vol. 5088, pp. 146-157 (2003).

Hyde et al., "Mapping Forest Structure for Wildlife Habitat Analysis Using Multi-Sensor (LiDAR, SAR/InSAR, ETM+, Quickbird) Synergy", Remote Sensing of Environment, vol. 102, pp. 63-73 (2006).

De Lafontaine et al., "LAPS: The Development of a Scanning Lidar System with GNC for Autonomous Hazard Avoidance and Precision Landing"; *Spaceborne Sensors* (Robert D. Habbit, Jr. and Peter Tchoryk, Jr., ed.), Proceedings of SPIE, vol. 5418, pp. 81-93 (2004).

Lamoreux et al., "Relative Navigation Sensor for Autonomous Rendezvous and Docking", *Laser Radar Technology and Applications VIII* (Gary W. Kamerman, ed.), Proceedings of the SPIE, vol. 5086, pp. 317-328 (2003).

Lefsky et al., "Estimates of Forest Canopy Height and Aboveground Biomass Using ICESat", Geophysical Research Letters, vol. 32, L2202, 4 pages (2005).

Marino and Davis, Jr., "Jigsaw: A Foliage-Penetrating 3D Imaging Laser Radar System"; Lincoln Laboratory Journal, vol .15, No. 1, pp. 23-36 (2005).

Oberle and Davis, "Toward High Resolution, Ladar-Quality 3-D World Models Using Ladar-Stereo Data Integration and Fusion," Army Research Laboratory, ARL-TR-3407, 37 pgs (2005).

Pack et al., "A Co-Boresighted Synchronized Leder/EO Imager for Creating 3D Images of Dynamic Scences", *Laser Radar Technology and Applications, X* (Gary W. Kamerman, ed.), Proceedings of SPIE, vol. 5791, pp. 42-50 (2005).

Pierrottet et al., "Characterization of 3-D Imaging Lidar for Hazard Avoidance and Autonomous Landing on the Moon"; *Laser Radar Technology and Applications XII* (Monte D. Turner and Gary W. Kamerman, ed.), Proceedings of SPIE, vol. 6550, pp. 655008-1-655008-9 (2007).

Riris et al., "The Lunar Orbiter Laser Altimeter (LOLA) on NASA's Lunar Reconnaissance Orbirot (LRO) Mission", *Sensors and Systems for Space Applications* (Richard T. Howard and Robert D. Richards, ed.), Proceedings of SPIE, vol. 6555, pp. 655501-1-655501-8 (2007).

Roberts, Jr. and LeVan, "Aperture Sharing Between Low-Background Infrared Sensors and Ladar Sensors", Aerospace Applications Conference, Proceedings of the IEEE, vol. 4, pp. 495-508 (1996).

Smith et al., "Diffractive Optics for Moon Topography Mapping"; *Micro (MEMS) and Nanotechnologies for Space Applications* (Thomas George and Zhong-Yang Cheng, ed.), Proceedings of SPIE, vol. 6223, pp. 622304-1-622304-10 (2006).

Stentz et al., "Real-Time, Multi-Perspective Perception for Unmanned Ground Vehicles", Proceedings of the Association for Unmanned Vehicle Systems International, 15 pgs (2003).

Stettner et al., "Three Dimensional Flash Ladar Focal Planes and Time Dependent Imaging" Advanced Scientific Concepts, Inc., 5 pgs (2006).

Tan and Narayanan, "Design and Performance of a Multiwavelength Airborne Polarimetric Lidar for Vegetation Remote Sensing"; Journal of Applied Optics, vol. 43, No. 11, pp. 2360-2368 (2004).

Trenkle et al., "3D Sensor Algorithms for Spacecraft Pose Determination", *Spaceborne Sensors III* (Richard T Howard and Robert D. Richards, ed.), Proceedings of SPIE, vol. 6220, pp. 62200D-1-62200D-14 (2006).

Weinberg et al., "Flash Lidar Systems for Hazard Detection, Surface Navigation and Autonomous Rendezvous and Docking", 2007 LEAG Workshop on Enabling Exploration, 2 pgs (2007).

Yoon et al., "High Frequency Attitude Motion of ICESat", *Advances in Astronautical Sciences* (David A. Vollado, Michael J. Gabor and Prasun N. Desai ed.), vol. 120: Spaceflight Mechanics, Part 1, pp. 117-131 (2005).

Robert C. Fenton, "A LADAR-Based Pose Estimation Algorithm for Determining Relative Motion of a Spacecraft for Autonomous Rendezvous and Dock", Master of Science thesis, Utah State University, 90 pages (May 2008).

Chen et al., "RANSAC-Based DARCES: A New Approach to Fast Automatic Registration of Partially Overlapping Range Images", IEEE Transactions on Pattern Analysis and Machine Intelligence, vol. 21, No. 11, 6 pages (Nov. 1999).

Vasile et al., "Pose-Independent Automatic Target Detection and Recognition Using 3D Laser Radar Imagery", Lincoln Laboratory Journal, vol. 15, No. 1, 18 pages (2005).

Ruel et al., "Field Testing of a 3D Automatic Target Recognition and Pose Estimation Algorithm", Automatic Target Recognition XIV, Spie vol. 5426, 10 pages (2004).

Allen et al., "Rendezvous Lidar Sensor System for Terminal Rendezvous, Capture, and Berthing to the International Space Station", Sensors and Systems for Space Applications II, SPIE vol. 6958, 8 pages (Mar. 2008).

Jasiobedzki et al., "Autonomous Satellite Rendezvous and Docking Using LIDAR and Model Based Vision", Spaceborne Sensors II, SPIE vol. 5798, 12 pages (2005).

Fenton et al., "Simulation Tests of a Lidar-based Spacecraft Pose Determination Algorithm", Sensors and Systems for Space Applications, SPIE vol. 6555, 11 pages (2007).

Ruel et al., "Real-Time 3D Vision Solution for On-Orbit Autonomous Rendezvous & Docking", Spaceborne Sensors III, SPIE 6220, 11 pages (2006).

Trenkle et al., "3-D Sensor Algorithms for Spacecraft Pose Determination", Spaceborne Sensors III, SPIE vol. 6220, 14 pages (2006).

Wikipedia, "RANSAC", available at http://en.wikipedia.org/wiki/RANSAC, 5 pages (printed Sep. 11, 2009).

Earhart et al., U.S. Appl. No. 12/464,009, Entitled "Flash LADAR System", filed May 11, 2009, 51 pages.

Notice of Allowance and Fee(s) Due for U.S. Appl. No. 12/357, 251, mailed Sep. 13, 2011, 11 pages.

* cited by examiner

Measurement Database

| Partial Separation Database | | | | | |
|---|---|---|---|---|---|
| Vertex 1 | Vertex 2 | Vertex 3 | Separation 1-2 | Separation 1-3 | Separation 2-3 |
| $1(x_1,y_1,z_1)$ | $2(x_2,y_2,z_2)$ | $4(x_4,y_4,z_4)$ | 1-2 Distance | 1-4 Distance | 2-4 Distance |
| $2(x_2,y_2,z_2)$ | $4(x_4,y_4,z_4)$ | $6(x_6,y_6,z_6)$ | 2-4 Distance | 4-6 Distance | 2-6 Distance |
| $2(x_2,y_2,z_2)$ | $6(x_6,y_6,z_6)$ | $5(x_5,y_5,z_5)$ | 2-6 Distance | 5-6 Distance | 2-5 Distance |
| $2(x_2,y_2,z_2)$ | $5(x_5,y_5,z_5)$ | $3(x_3,y_3,z_3)$ | 2-5 Distance | 2-3 Distance | 3-5 Distance |

240

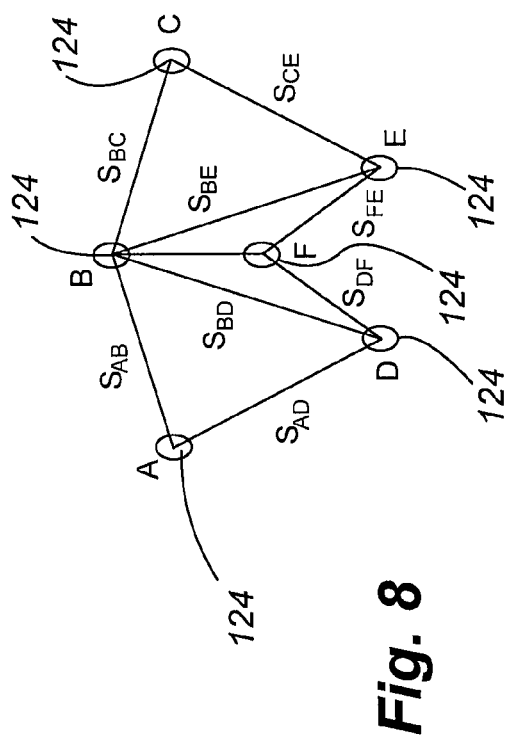

ModelDatabase

| Partial Separation Database | | | | | |
|---|---|---|---|---|---|
| Vertex 1 | Vertex 2 | Vertex 3 | Separation 1-2 | Separation 1-3 | Separation 2-3 |
| $A(x_A,y_A,z_A)$ | $B(x_B,y_B,z_B)$ | $D(x_D,y_D,z_D)$ | A-B Distance | A-D Distance | B-D Distance |
| $B(x_B,y_B,z_B)$ | $D(x_D,y_D,z_D)$ | $F(x_F,y_F,z_F)$ | B-D Distance | D-F Distance | B-F Distance |
| $B(x_B,y_B,z_B)$ | $F(x_F,y_F,z_F)$ | $E(x_E,y_E,z_E)$ | B-F Distance | F-E Distance | B-E Distance |
| $B(x_B,y_B,z_B)$ | $E(x_E,y_E,z_E)$ | $C(x_C,y_C,z_C)$ | B-E Distance | B-C Distance | E-C Distance |

236

METHOD AND APPARATUS FOR LIDAR TARGET IDENTIFICATION AND POSE ESTIMATION

FIELD

A method and apparatus for efficiently identifying an imaged target are provided. In addition, a relative attitude, angular rate, position, and velocity of a target can be determined.

BACKGROUND

Space operations such as rendezvous, docking, and proximity operations can be very challenging and are complicated by the precise nature and errors of the measurements for navigating and controlling the relative motion and orbits between the spacecrafts or other space targets of interest. These operations are generally performed using a suite of sensors which provide navigation data. The typical sensor suite may include various types of instruments which provide measurements from the component systems, such as visible and infrared sensors, laser range finders, LIDARs (light detection and ranging), LADARs (laser detection and ranging), inertial measurement units, and GPS (global positioning system) receivers.

In connection with docking missions, systems have been developed that provide range measurements from laser range finders, or that use data from visual cameras. The laser ranger finders are used to measure ranges, while the visible wavelength cameras measure relative angles, and inter-distances based on that information.

Imaging LADAR systems can be used in connection with the identification of target objects or regions of a body. LADAR systems have also been recognized as being useful in various landing and/or docking scenarios. For example, the use of LADAR systems for docking spacecraft has been proposed. LADAR systems have also been proposed for use in connection with landing vehicles onto surfaces.

For meeting the needs of these missions, three-dimensional imaging sensors, particularly Laser Detection and Ranging sensors, have emerged as a leading candidate for a variety of reasons. Docking systems have used visual cameras as a sole source of navigation data, but these sensors aren'table to directly measure the range between the sensor and the target. Other docking systems have used scanning LADARs, but these sensors are higher in mass, require more power and are less reliable than a flash LADAR sensor. For some landing systems, present LADAR solutions typically involve two LADAR sensors. One of the LADAR sensors uses the complex coherent LADAR technique to provide ranging, descent and lateral velocity information while the other LADAR provides terrain aided navigation and hazard detection and avoidance (HDA) using a flash three-dimensional LADAR. However, the use of multiple sensors increases the mass and power requirements, reduces reliability and adds complexity to the landing function.

In order to perform real world docking or landing procedures, a target object or area in the field of view of the LADAR must first be identified. The identification of a target using a LADAR system typically involves iterative processes. For example, previously developed algorithms, such as the RANdom SAmple Consensus (RANSAC) or natural feature image recognition (NFIR) algorithms are significantly slower in the identification process, and require the use of iterative methods to arrive at a solution. As a result, such processes are relatively time consuming, and usually involve some degree of uncertainty.

SUMMARY

Embodiments of the disclosed invention are capable of identifying an imaged target scene in a non-iterative fashion. Systems and methods in accordance with embodiments of the disclosed invention can also be used to determine pose solutions relative to known target scenes. In particular, estimates of the relative position, velocity, attitude and angular rate can be determined. The determination of a pose solution includes extracting geometric or signal level features from image data to identify points in that data. Separation distances between the points are determined and stored in a measurement database. If a match of separation distances between measured data and model data (determined a priori) is found, embodiments of the disclosed invention solve for the rotation quaternion and translation value that translates the measured data into the frame of reference of the model data (or vice versa). If the match between the model data and the measurement data after applying the rotation quaternion and translation value is of sufficient accuracy, the match is considered valid. From a valid match and the rotation quaternion and translation value, position and attitude data relative to the identified target scene can be output.

In accordance with embodiments of the disclosed invention, target scene identification is performed directly. The identification of a target includes comparing data collected by an imaging LADAR to data contained in a model database. The data contained within the model database includes separation distances between points comprising a model of the target scene. The separation distances can be sorted into sets of three points, where each set of three points defines a triangle. The separation distances in the model database can also be sorted according to their lengths. The separation distances for points in the imaged scene defining triangles can then be compared to separation distances for sets of points defining triangles in a model target scene included in the model database.

The points in the databases can comprise geometric data or brightness data. Geometric data can be extracted using edge detection methods. Brightness or signal level features can be extracted by setting a brightness threshold and extracting all points having a brightness above that threshold. The geometric data or brightness data is converted into single point positions using a centroiding algorithm. These point positions are used in the model database. In particular, the points are divided into sets of three points, defining triangles, and for each such triangle the separation distance between the points is stored. Accordingly, a complex image of a scene can be represented by singular points. Moreover, the process of calculating centroids, which includes processing raw pixel data and using a threshold check to extract clean image data, has the effect of removing noise.

The separation distances, which are calculated a priori for the model, can be sorted in the model database in descending order, with the largest absolute distance for the legs of the triangle represented by a row of the database occupying the first row of data. Moreover, the separations between points in a row of data can be ordered such that the separation distances within a row go from the longest to the shortest.

The LADAR image data collected from a scene is processed using centroiding algorithms, in a manner similar to the processing of information contained in the model database. In particular, geometric or signal level features are extracted from collected image data obtained from the target scene, and are converted into single point positions using a centroiding algorithm. The separation distances between centroids within sets defining triangles are calculated, and placed in a measurement database. The measurement database is sorted in the same way that the model database is sorted.

After the model and measurement databases have been populated and sorted, a matching algorithm looks for matches. In particular, the matching algorithm selects a candidate triangle from the measurement data, and compares the separation distances of that candidate triangle with data in the model database. Once a match of sufficient accuracy is found, the matching algorithm attempts to verify that the set of model indices match the set of measurement indices by solving for the rotation quaternion and translation, translating the measurement data into the model data, and calculating how well they match. If the match is of sufficient accuracy, other points defining other triangles in the model database can be used against other measured points as a cross-check. If sufficient points used in the cross-check match the table with selected accuracy, the match is considered valid. If insufficient matches are found, or the matches are of insufficient accuracy, the algorithm steps to the next orientation and continues to search for matches.

A six degree of freedom (DOF) least squares fitting method may be used to calculate a rotation and translation. The six DOF least squares fit can be performed when at least three centroids are available, identified and have been validly matched to model centroids. To ameliorate the possibility of false identifications, four centroids are required. Initially, the center of gravity of the centroid measurements is computed. Cross-correlation between the model and measured databases is computed, and matrix values are extracted. Based on these inputs, another set of matrices are computed, and the eigenvalues and eigenvectors can be computed. From the rotation quaternion, which corresponds to the eigenvector with the minimum eigenvalue, the direction cosine matrix can be obtained and used to calculate the range vector. The determined rotation quaternion and translation can then be applied to the other measurements, which can then be rotated into the model frame, and the proximity of the measured points to any model points are then used to determine the validity of the solution.

From position and attitude data between different calculation cycles, estimates of velocity and angular rate can be made. In addition, once three estimates of position and orientation are available, acceleration data can be used to propagate velocity and angular rate data at future time intervals. The pose solution generated by embodiments of the disclosed invention can be used in connection with velocity and controlling the position of a vehicle carrying the LADAR system relative to the imaged scene, for example in connection with docking or landing procedures.

Additional features and advantages of embodiments of the disclosed invention will become more readily apparent from the following description, particularly when taken together with the accompanying drawings.

BRIEF DESCRIPTION OF THE DRAWINGS

FIG. 8 depicts the spatial relationship between points in a modeled scene in accordance with embodiments of the disclosed invention;

FIG. 9 depicts a model database in accordance with embodiments of the disclosed invention;

DETAILED DESCRIPTION

As can be appreciated by one of skill in the art, a LADAR is a laser detection and ranging system. As can also be appreciated by one of skill in the art, a LIDAR or light detection and ranging system is essentially equivalent to a LADAR system. In particular, both LADAR and LIDAR systems use a pulsed light source to produce light that is reflected from a target to obtain range information. Moreover, the term LADAR is commonly used in connection with systems having defense applications, while the term LIDAR is commonly used in connection with non-military applications. However, in the present description, no distinction between the terms is made. Therefore, for ease of description and consistency, the term LADAR is used throughout this description. However, it should be understood that the term LADAR is also intended to encompass LIDAR, to the extent that a distinction between the terms might otherwise be drawn.

Figure 1A:
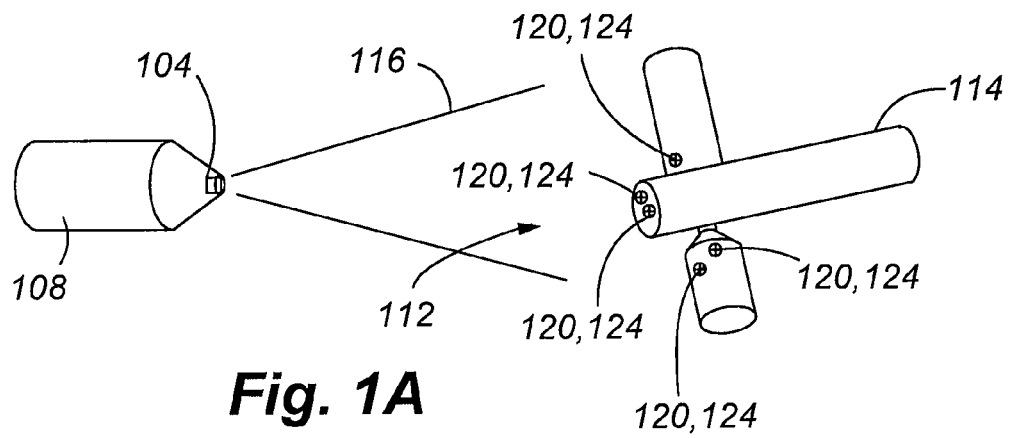
FIG. 1A depicts a LADAR system in accordance with embodiments of the present invention applied in a docking scenario.

FIG. 1A depicts a docking scenario using a LADAR system 104 in accordance with embodiments of the disclosed invention. In this scenario, the LADAR system 104 is associated with a space borne vehicle 108. Moreover, the space borne vehicle 108 is approaching a target scene 112 that comprises another space borne vehicle 114. In general, the target scene 112 is placed within the field of view 116 of the LADAR system 104. A plurality of indicia or features 120 comprising points 124 may be associated with the target scene 112. As described in greater detail elsewhere herein, the relative location of and spacing between the points 124 is used to uniquely identify the target scene 112 and to determine a pose solution. In the example of FIG. 1A, the points 124 correspond to indicia 120 that comprise retroreflectors placed at different locations on the vehicle 114. Alternatively or in addition, the points 124 may correspond to indicia or features 120 that comprise prominent features of the vehicle 114.

Figure 1B:
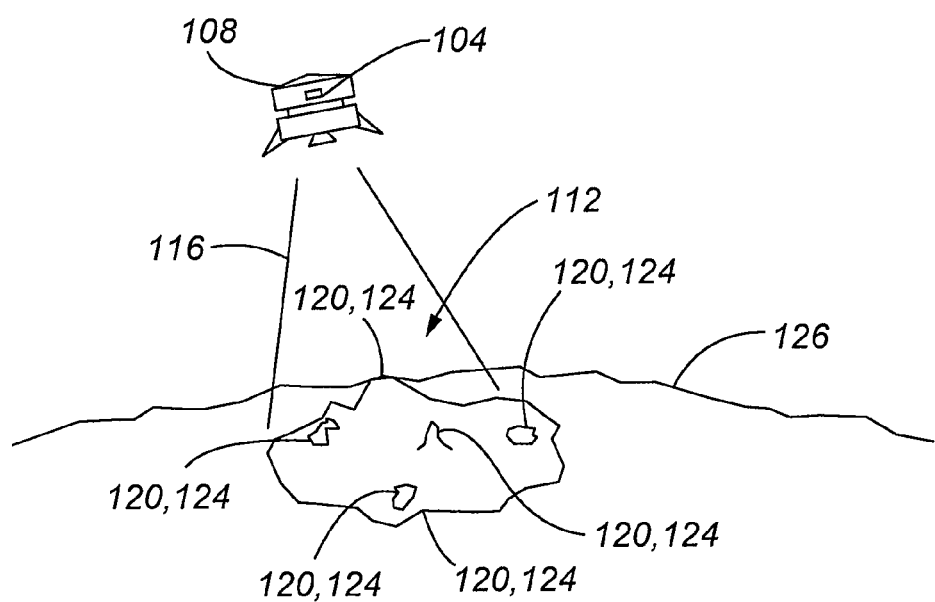
FIG. 1B depicts embodiments of a LADAR system in accordance with embodiments of the present invention applied in a landing scenario.

FIG. 1B depicts a LADAR system 104 being operated in connection with a landing scenario. As shown in this example, a vehicle 108 carrying the LADAR system 104 is approaching a target scene 112 comprising an area on the surface of a planetary or other body 126. The LADAR system 104 identifies indicia or features 120 that correspond to points 124 on the surface of the body 126. These points 124 are used by the LADAR system 104 to uniquely identify the target scene 112 and to calculate a pose solution for the vehicle 108 relative to the body 126. In the example of FIG. 1B, the target scene 112 comprises a landing zone, and the indicia or features 120 that correspond to the points 124 used to identify the target scene 112 comprise features 120 of the landscape within the target scene 112.

Figure 2:
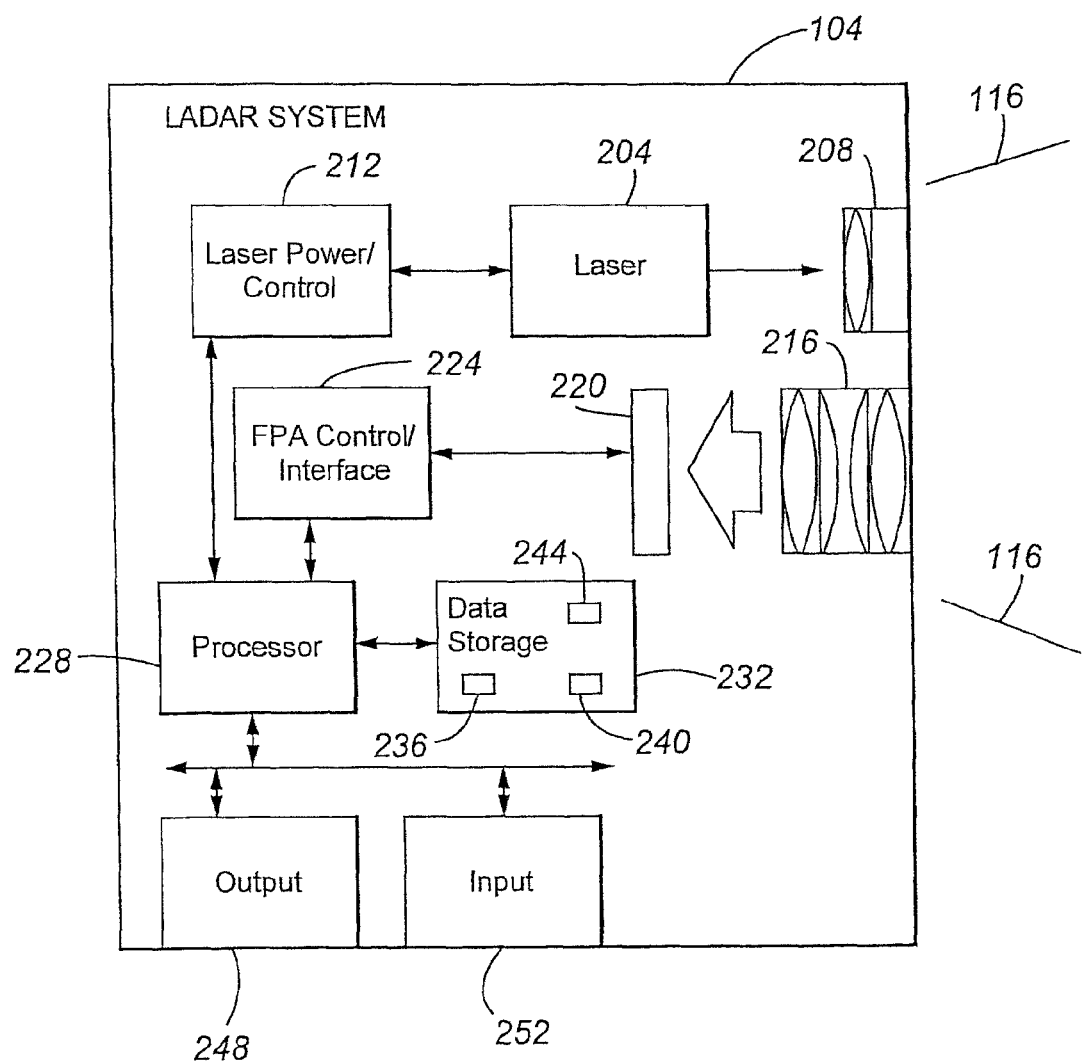
FIG. 2 depicts components of a LADAR system in accordance with embodiments of the present invention.

FIG. 2 depicts components of a LADAR system 104 in accordance with embodiments of the disclosed invention. In general, the LADAR system 104 includes a laser 204 and associated transmit optics 208. The laser 204 is interconnected to a laser power/control unit 212, to control the power, timing, duration, and/or wavelength of output pulses produced by the laser 204. The transmit optics generally operate to direct the light output by the laser 204 towards a target scene 112, and to illuminate targets 120 within the target scene 112.

The LADAR system 104 also includes receive optics 216 which operate to collect laser light reflected from targets 120 in the field of view 116 of the LADAR system 104. The light collected by the receive optics 216 is provided to a focal plane array 220. As can be appreciated by one of skill in the art after consideration of the present disclosure, the focal plane array 220 includes a plurality of pixels that sense photons transmitted by the transmit optics 208 that have been reflected by indicia or features 120 within a target scene 112, and that have been collected by the receive optics 216. In addition, each pixel is sampled at a rate that is high enough that a wavefront time history for each pixel can be formed. In accordance with embodiments of the present invention, an intensity threshold function triggers a return pulse time of arrival, yielding range information for each pixel. This range information can in turn be processed to yield three-dimensional image information. A focal plane array control/interface unit 224 may be provided to control the operation of the focal plane array 220, to read out data collected by the focal plane array 220, and to process the read out data to obtain the three-dimensional image information. The focal plane array control/interface unit 224 may comprise a field programmable gate array (FPGA) or other processor. Together, the receive optics 216, the focal plane array 220, and the focal plan array control/interface unit 224 or other processing implementing the intensity threshold function and range determination functions comprise an imaging sensor.

The LADAR system 104 may also include a processor 228 capable of executing instructions or code, for example stored as software or firmware, and operable to handle data and to calculate a pose solution as described herein. As examples, the processor 228 may comprise a general purpose programmable processor, a controller, or programmable processors and/or controllers in various numbers and/or combinations.

Data storage 232 may hold a model database 236 and a measurement database 240. The data storage 232 may also be used to store instructions or code that is executed by the processor 228 in connection with the operation of the LADAR system 104. For example, the data storage 232 may store a pose estimation application 244 that includes various algorithms for scene identification and pose estimation in accordance with embodiments of the present invention. In accordance with embodiments of the present invention, the data storage 232 may be implemented as solid state memory and/or other suitable data storage technologies. Moreover, the data storage 232 may comprise different data storage technologies for different types of data and/or instructions. For example, instructions executed by the processor 228 may be stored or recorded as firmware provided in memory associated with the processor 228, for example where the processor 228 comprises a controller, in data storage 232 comprising read only memory, or a magnetic storage device, such as a hard disk drive. As a further example, the data comprising the model database 236 may be stored in data storage 232 comprising solid state memory, magnetic data storage, or optical data storage. As yet another example, data comprising the measurement database 240 may be stored in data storage 232 comprising solid state memory or magnetic data storage.

The LADAR system 104 may also include an output 248, for example to provide a pose solution to systems that can apply the pose estimate to controlling the position of a vehicle 108 associated with the LADAR system 104 relative to a target scene 112. Alternatively or in addition, the output 248 may comprise a human perceptible output. An input 252 may also be provided, for example to accept data comprising some or all of a model database and operational input.

Figure 3:
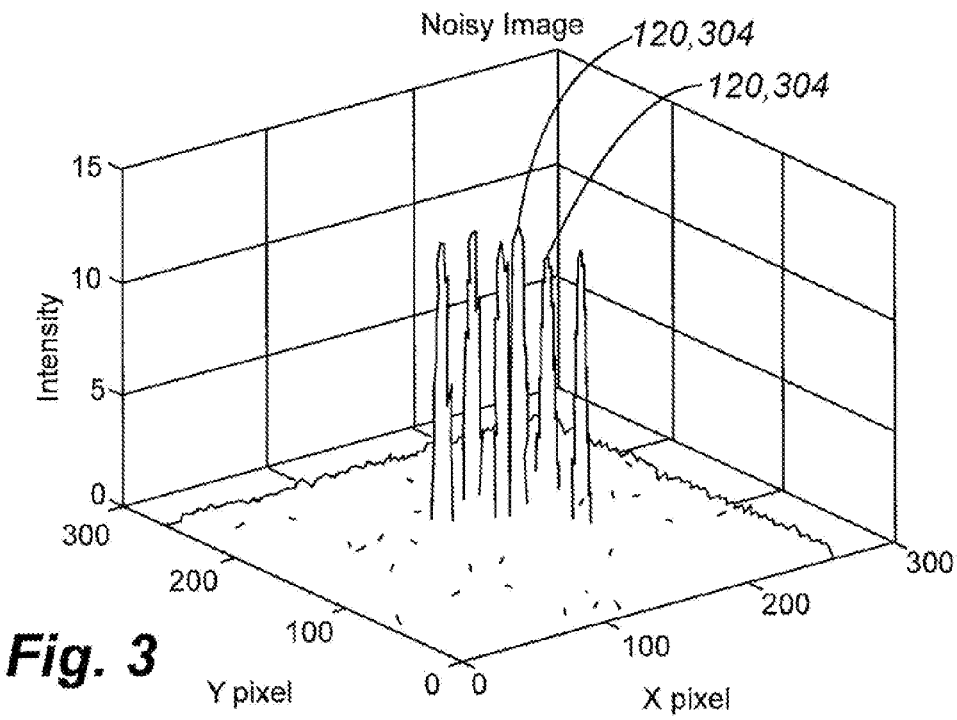
FIG. 3 is an exemplary depiction of raw LADAR data obtained using a LADAR system in accordance with embodiments of the present invention.

FIG. 3 illustrates an exemplary set of image data obtained from a target scene 112 by a LADAR system 104 in accordance with embodiments of the present invention. In particular, FIG. 3 illustrates that features in a target scene 112 within the field of view 116 of the LADAR system 104 are associated with location information, and intensity information. In particular, in the example of FIG. 3, relatively intense returns 304 have been received at six different x, y locations within the target scene 112. Although only x and y coordinates and intensity for each of the returns are illustrated, it should be appreciated this has been done for ease of illustration and description. However, the LADAR system 104 will typically obtain information about features 120, in the form of returns 304, within a target scene 112 in three dimensions, such that each return 304 is represented by x, y and z coordinates. Therefore, the example return 304 can be understood as corresponding to features 120 within a target scene 112 that lie in a common plane. Moreover, since data collected by a LADAR system 104 is illustrated in FIG. 3, the plane containing the features 120 is orthogonal to the plane of the LADAR system 104 focal plane array 220.

Figure 4:
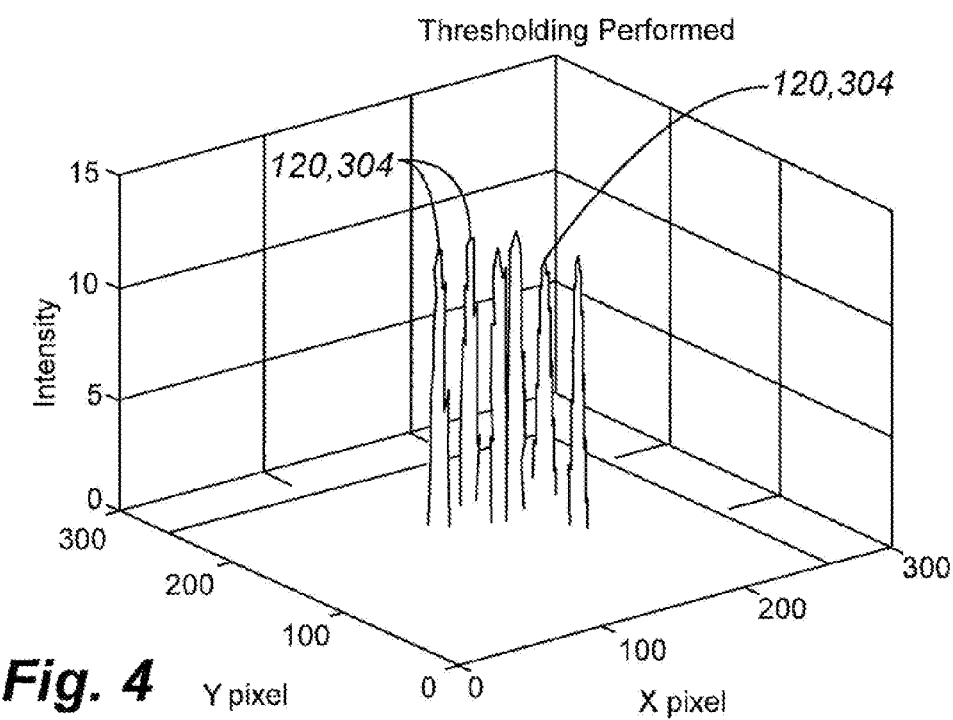
FIG. 4 is a depiction of the exemplary LADAR data of FIG. 3, after thresholding has been performed.

In order to assist in the identification of features 120 in data obtained by the LADAR system 104 as returns 304, thresholding may be performed. For example, signal level features may be extracted by setting a brightness threshold, with the effect that noise is removed from the data, as depicted in FIG. 4. As an alternative to the extraction of signal level features, geometric features can be extracted from the image data obtained by the LADAR system 104. The extraction of geometric features may be performed using edge detection methods.

Figure 5:
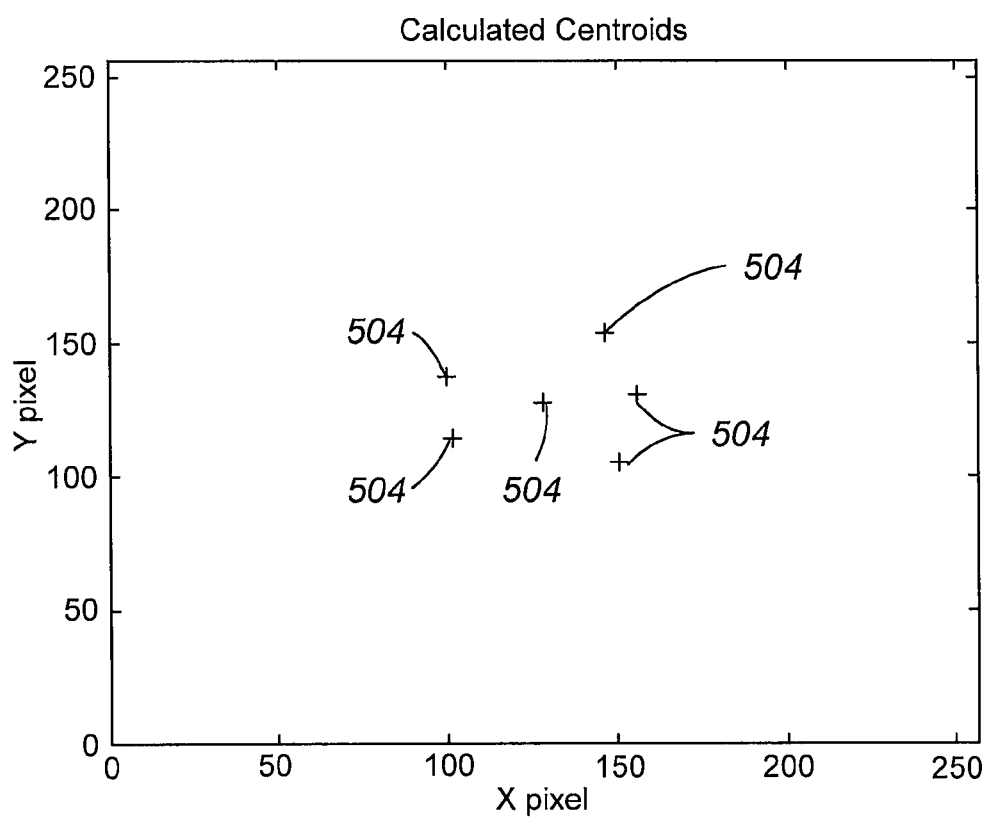
FIG. 5 depicts points identified in the exemplary LADAR data of FIGS. 3 and 4.

After extracting signal level or geometric features 304 from the image data, the resulting brightness data or geometric data can be converted into single point positions using a centroiding algorithm. The centroiding algorithm uses the image data, for example the cleaned image data obtained using a threshold check, to calculate centroids. The result of this calculation, which results in a complex image or target scene 112 being represented by singular data points 504, is depicted in FIG. 5. In particular, the data points 504 of FIG. 5 correspond to the features 304 in FIGS. 3 and 4. More particularly, the features 304 are now represented as data points 504 located at determined locations. In the example of FIG. 5, the locations of the data points 504 differ only in x and y coordinates, as the data points 504 in this example all lie in the same plane (i.e., the value in the z dimension is the same for all of the data points 504). However, the centroiding, scene identification, and pose estimation algorithms of the disclosed invention do not require target data points to lie in the same plane.

Figures 6, 7:
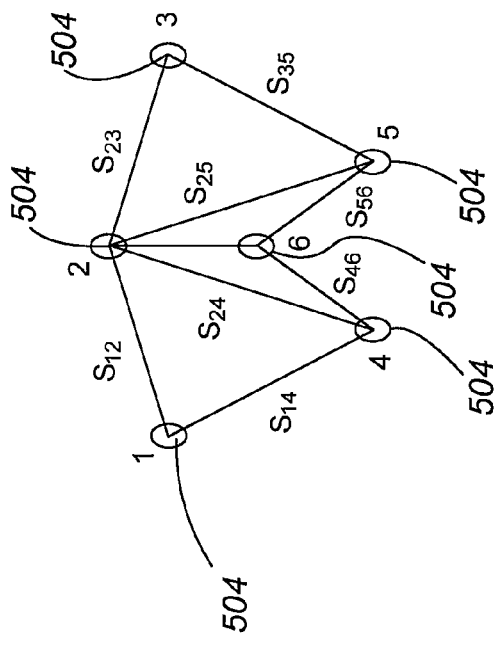
FIG. 6 depicts spatial relationships between the points of FIG. 5.
FIG. 7 depicts a measurement database in accordance with embodiments of the disclosed invention.

FIG. 6 depicts relationships between the data points 504 of FIG. 5. More particularly, FIG. 6 represents the data points 504 as the vertices of triangles constructed between the data points 504 in various combinations. In general, the number of triangles that can be constructed using N number of data points 504 is equal to $$\frac{N(N-1)}{2}.$$

Therefore, in the present example, which includes six data points 504, a total of fifteen triangles could be constructed. In the example of FIG. 6, the number of triangles has been limited to 4, for ease of description and illustration.

Data concerning the location of individual data points 504 may be included in the measurement database 240, the contents of which are depicted in FIG. 7. In particular, each data point 504 is associated with a location, which can be represented as an x, y and z coordinate established with respect to a selected frame of reference. In addition, the measurement database 240 is organized into sets of information, where each set of information contains location information for each data point 504 forming the vertex of a triangle, and the separation distances between the different points of the triangle. Accordingly, individual data points or vertices 504 can appear in the measurement database 240 multiple times.

FIG. 8 depicts the relationship between points 124 in a modeled scene in accordance with embodiments of the disclosed invention. In particular, the points 124 in this example uniquely identify a modeled target scene 112 that corresponds to the imaged target scene 112 depicted or represented by the data points 504 illustrated in FIG. 6. The location of the points 124 in the modeled scene are obtained a priori. For example, where the target scene 112 is associated with indicia 120 that have been placed on a vehicle 114, the locations of those points 124, with respect to a first frame of reference, can be obtained through direct measurement or knowledge of the locations at which the indicia 120 have been placed. As a further example, where the target scene 112 that is uniquely identified by the points 124 comprises features 120 of a landing site on a planetary body 126, the locations of the points 124 with respect to a selected frame of reference can be obtained through direct measurement, prior LADAR surveys, or surveys using other techniques. Also depicted are the legs of triangles constructed using the points 124 as vertices. The number of triangles shown has been limited for ease of description and illustration, although it should be appreciated that additional triangles can be constructed from the example collection of points 124.

The information concerning the locations of the points 124 within the modeled target scene 112 is placed in a model database 236, for example as depicted in FIG. 9. As shown, the locations of the points 124 can be indicated using x, y and z coordinates. Moreover, the model database 236 may be organized such that the points 124 are included in sets of three, where each set defines a triangle. In addition, the separation distances between the points 124 comprising the vertices of each triangle are included in the database 236. As can be appreciated by one of skill in the art after consideration of the present disclosure, the reference frame for the coordinates describing the location of data points 504 recorded in the measurement database 240 is different than the reference frame for the coordinates describing the points 124 recorded in the model database 236.

Figure 10:
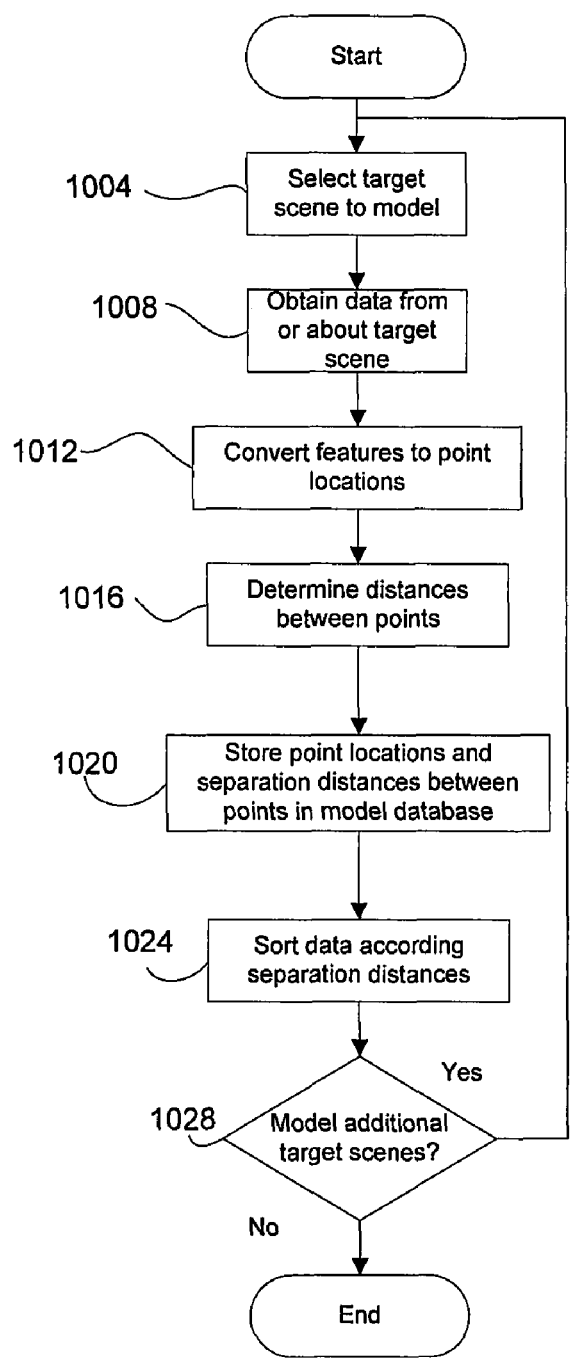
FIG. 10 is a flowchart depicting aspects of the creation of a model database in accordance with embodiments of the disclosed invention.

FIG. 10 is a flowchart depicting aspects of the creation of a model database 236 containing information related to a modeled target scene 112 in accordance with embodiments of the present invention. Initially, at step 1004, a target scene 112 to model is selected. For example, where the model database 236 will be used in connection with docking operations between a vehicle 108 carrying a LADAR system 104 and another vehicle 114, the target scene 112 may comprise the other vehicle 114 and indicia or features 120 associated with the target vehicle 114. Moreover, the indicia or features 120 may comprise points 124 that can be used to uniquely identify the target scene 112 comprising the vehicle 114. The indicia or features 120 may additionally comprise points 124 that allow a pose estimate or solution relative to the other vehicle 114 to be generated by the LADAR system 104. As can be appreciated by one of skill in the art, indicia 120 can be added to a target scene 112 to assist in uniquely identifying that target scene 112 and/or to assist in the generation of a pose estimate by a LADAR system 104. As a further example, in a landing scenario, the target scene 112 may comprise an area of a planetary body 126 where a landing by a vehicle 108 associated with a LADAR system 104 will be performed.

At step 1008, data is obtained from or about the selected target scene 112. For example, measurements can be taken to locate indicia or features 120 within the target scene 112. This data may be obtained using various means. For example, where the target scene 112 is readily accessible, the data may be obtained about the target scene 112 using direct measurement. As a further example, where the target scene 112 is not readily accessible, data about that scene may be obtained through remote means, such as through a survey using LADAR or other techniques. As yet another example, where the target scene 112 encompasses a manmade vehicle 114 or structure, design information regarding that vehicle 114 or structure can be used as the source of the target scene 112 data.

The indicia and/or features 120 within the modeled target scene 112 are then converted to point 124 locations (step 1012). For example, the indicia or features 120 are identified according to their x, y, z coordinates, with respect to a first frame of reference. The locations of the indicia or features 120 identified within the target scene 112 in turn define the points 124 that can be used to uniquely identify the target scene 112 and to allow pose estimates to be calculated.

Using the coordinates of the point 124 locations, distances between the points 124 can be calculated (step 1016). More particularly, the separation distances are determined between pairs of points 124 that form the legs of triangles that can be constructed between the plurality of points 124 obtained from the target scene 112. In accordance with embodiments of the present invention, the calculation of the separation distances can be performed as follows:

For a set of N measurements:
1) Do this loop N(N−1)/2 times
2) Extract a set of three points
3) Calculate the separation distances between each leg of the triangle.

The following equation shows one of the separation calculations.

$$D_{12} = |\vec{D}_2 - \vec{D}_1|$$

Where $D_1$ is the measured distance vector from the LADAR to the $1^{st}$ target,
$D_2$ is the measured distance vector from the LADAR to the $2^{nd}$ target, and
$D_{12}$ is the distance magnitude between the $1^{st}$ and $2^{nd}$ targets.

4) Once the three separation distances have been computed, sort them in descending order and build a row of the separation matrix which contains the all vertices and separation distances.

After N (N−1)/2 rows of the matrix have been added, sort the rows in descending separation distance order.

The point 124 locations and separation distances between the points 124 are stored in the model database 236 (step 1020). For example, as shown in FIG. 9, the model database 236 may comprise a table, with each line of the table including a set of points 124 comprising the vertices of a triangle. The location of each vertex is included in the information stored as part of the model database 236 using a selected coordinate system and a selected first frame of reference. In addition, in each line the separation distances between the points 124 comprising the vertices of the triangle for that line are included in the model database 236.

At step 1024, the data in the model database 236 is sorted according to the separation distances. Specifically, the lines of data may be sorted such that the line with the largest total separation distances (i.e., the triangle with the largest perimeter) occupies the first line of the model database 236. Sorting the data can additionally include sorting the separation distances along a line of data. For example, the data can be arranged so that the separation distance comprising the longest leg of the triangle represented by a line occupies the leftmost field containing separation information. Although one example for ordering the model database 236 has been provided, it should be appreciated that other organizational schemes may be applied.

At step 1028, a determination may be made as to whether additional target scenes 112 are to be modeled. If additional target scenes 112 are to be modeled, the process may return to step 1004. If no additional target scenes 112 are to be modeled, the process may end.

Figure 11:
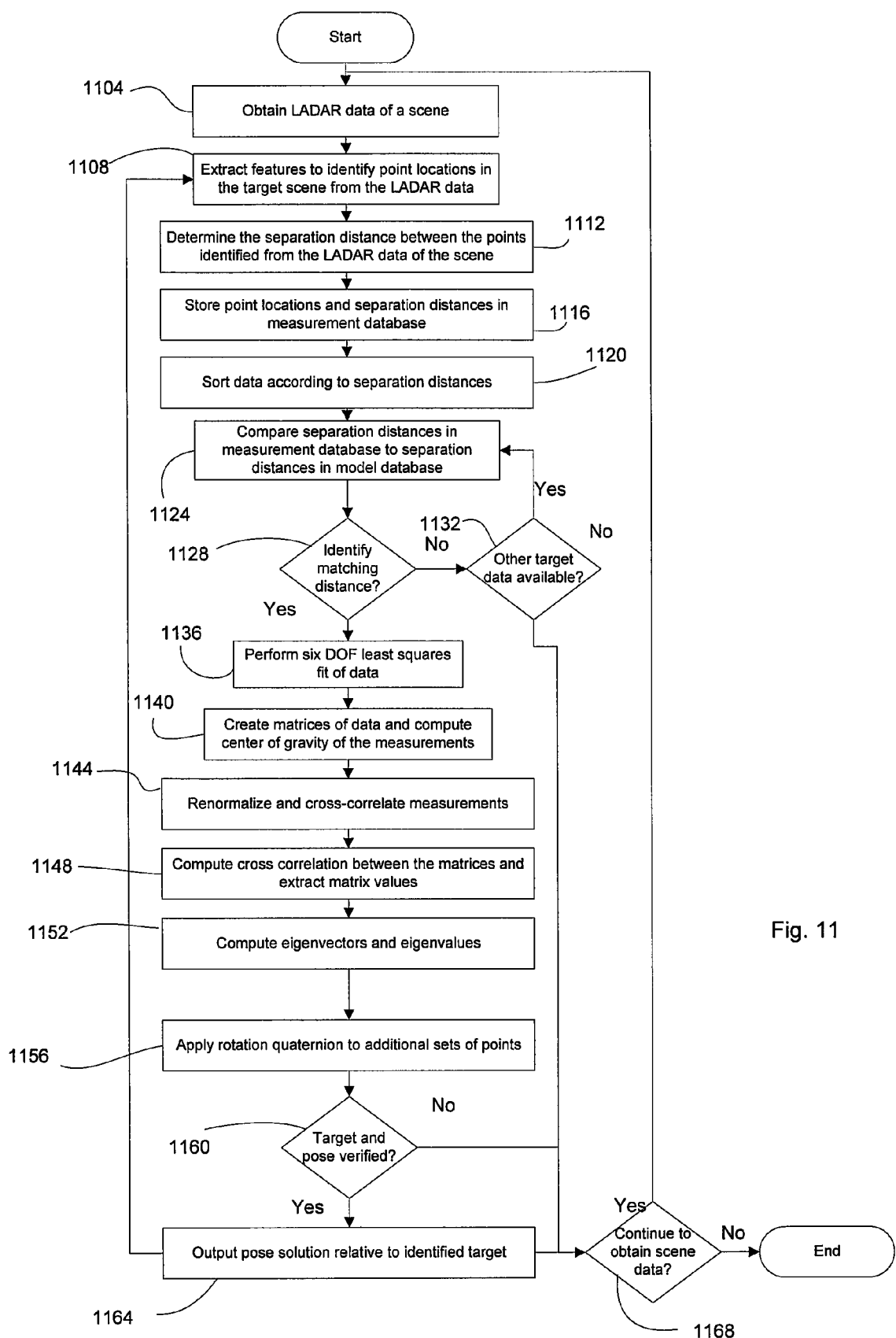
FIG. 11 is a flowchart depicting the determination of a pose solution in accordance with embodiments of the disclosed invention.

FIG. 11 is a flowchart depicting the determination of a pose solution in accordance with embodiments of the present invention. Initially, at step 1104, LADAR data is obtained from a target scene 112. In particular, a LADAR system 104 may be operated to obtain a three-dimensional image of a target scene 112. At step 1108, indicia or features 120 comprising data points 504 that may identify or correspond to points 124 in a target scene 112 represented in the model database 236 are extracted from the LADAR data. The extraction of data points 504 from targets or features 120 identified from obtained LADAR data can include the extraction of geometric or signal level features from the image data obtained from the target scene 112. The extraction of geometric features may be performed using edge detection methods. The extraction of signal level features may be performed by setting a brightness threshold and extracting all brightness above that threshold. In either case, the geometric data or brightness data is converted into single data point 504 locations using a centroiding algorithm. The centroiding algorithm processes the raw pixel data obtained by the LADAR system 104, and using a threshold check, extracts clean image data. That image data is in turn used to calculate centroids, identified by singular data points 504 having a location relative to a frame of reference applied by the LADAR system 104.

The separation distance between the data points 504 identified from the LADAR data of the target scene 112 are then determined. In particular, the separation distances between the data points 504 can be determined directly from the coordinates comprising the data point 504 locations obtained by the LADAR system 104 (step 1112). For example, the same steps used to calculate the separation distances between points 124 within the target scene 112 for purposes of populating the model database 236, as described above, can be used for calculating the separation distances between the data points 504 in the measured data obtained by the LADAR system 104.

The data point 504 locations and calculated separation distances may then be stored in the measurement database 240 (step 1116). More particularly, the data may be stored as sets of three data points 504 defining triangles, with the data points 504 or vertices identified by their x, y and z coordinates according to the LADAR system's 104 frame of reference, and with the separation distances between pairs of vertices in a triangle included with the point 504 position information. Moreover, each set of data point or vertex 504 location information and separation distances between those data points 504 may comprise a line of a table forming the measurement database 240.

At step 1120, the data within the measurement database 240 may be sorted according to separation distances. For example, the first line of data within the measurement database 240 may be occupied by the triangle having the largest perimeter (i.e., the largest total separation distances). The data within the measurement database 240 may further be sorted such that the longest leg of a triangle represented by a line of data occupies the left most field, with the middle field of separation distances containing the next longest leg, and the right most field of separation distances containing the shortest leg of the triangle. Other methods for organizing the data within the measurement database 240 may be applied. However, as can be appreciated by one of skill in the art, it can be advantageous to sort the measurement database 240 according to the same rules that the model database 236 has been sorted.

At step 1124, separation distances included in the measurement database 240 are compared to separation distances contained in the model database 236. More particularly, a candidate triangle (e.g., a line of data) is selected from the measurement database 240 and the separation distances between the vertices of that triangle are compared to the separation distances for triangles (e.g., lines of data) contained within the model database 236. A determination is then made at step 1128 as to whether the separation distances between the candidate triangle and a triangle within the model database 236 matches. In accordance with embodiments of the present invention, a match is declared if the separation distances are within a selected threshold amount of being an exact match. That is, for purposes of continuing to process a candidate triangle from the measurement database 240 with respect to a triangle within the model database 236, a match is declared if the separation distances between the legs of the candidate triangle in the measurement database 240 and the legs of a triangle within the model database 236 identifying a target scene 112 differ from one another by no more than a predetermined threshold or tolerance value.

If the comparison does not successfully identify a separation distance included in the model database 236 that corresponds to the separation distance of the triangle in the measurement database 240 being considered, a determination is next made at step 1132 as to whether additional triangles and corresponding separation distances remain in the measurement database 240 to be compared to data within the model database 236. This determination may include determining whether a sufficient number of additional lines of data remain in the measurement database 240 to be compared to data within the model database 236 such that additional processing of data within the measurement database 240 will be performed. For example, if a certain number of separation distances are required to match before further processing will be undertaken, and if the data remaining to be checked in the measurement database 240 is insufficient to meet that threshold, then the process will return to step 1104, and additional LADAR data of the target scene 112 will be obtained. If sufficient additional data remains in the measurement database 240, the process may return to step 1124 and comparisons of that data to data in the model database 236 can continue.

Once a candidate set of triangles from the measurement database 240 and the model database 236 have been identified, a specific ordering of the points between the measurements and model is assumed and a pose solution which is comprised of an attitude quaternion and a range vector is then computed using a least squares fitting technique (step 1136), and subsequent measurement data points 504 are rotated into the model frame and the residuals are then computed. If the residuals are sufficiently small for the correct number of matches, a valid solution is returned. If an insufficient number of matches is obtained, a different permutation of the triangle vertices in the model database is assumed, and a new potential solution is calculated. This includes creating a matrix containing the measurement data from the measurement database 240 for the target scene 112, creating a matrix containing the model database 236 information for the target scene 112, and computing the center of gravity of the measurements (step 1140). The centers of gravity can be computed for the measurement and model databases respectively as follows:

$$\vec{P}_{cg} = \frac{\sum_{i=1}^{n} \vec{P}_i}{n}$$

Where, $P_i$ is the center of the $i^{th}$ measurement point, and $P_{cg}$ is the calculated center of gravity for the measurements.

$$\vec{Y}_{cg} = \frac{\sum_{i=1}^{n} \vec{Y}_i}{n}$$

Where $Y_i$ is the center of the $i^{th}$ model point, and $Y_{cg}$ is the calculated center of gravity for the model points. The measurements are then renormalized and cross-correlated (step 1144). The measurement and model data is renormalized using the following equations:

$$\vec{P}_n = \vec{P}_i - \vec{P}_{cg}$$

Where, $P_n$ is the renormalized measurement point.

$$\vec{Y}_n = \vec{Y}_i - \vec{Y}_{cg}$$

Where $Y_n$ is the renormalized model point.

Then at step 1148 the cross-correlation between the $\vec{P}$ and $\vec{Y}$ matrices are computed, and several matrix values are extracted:

$$\tilde{C} = x\text{correl}(\vec{P}_n, \vec{Y}_n)$$

Where C is the cross-correlation matrix.

$$S_{xx} = C_{14}$$

$$S_{xy} = C_{15}$$

$$S_{xz} = C_{16}$$

$$S_{yx} = C_{24}$$

$$S_{yy} = C_{25}$$

$$S_{yz} = C_{26}$$

$$S_{zx} = C_{34}$$

$$S_{zy} = C_{35}$$

$$S_{zz} = C_{36}$$

Where the various S terms are elements from the C matrix. Now, computing another set of matrices based on these inputs:

$$B = \begin{bmatrix} S_{xx}+S_{yy}+S_{zz} & S_{yz}-S_{zy} & S_{zx}-S_{xz} & S_{xy}-S_{yx} \\ S_{yz}-S_{zy} & S_{xx}-S_{yy}-S_{zz} & S_{xy}+S_{yx} & S_{zx}+S_{xz} \\ S_{zx}-S_{xz} & S_{xy}+S_{yx} & -S_{xx}+S_{yy}-S_{zz} & S_{yz}+S_{zy} \\ S_{xy}-S_{yx} & S_{zx}+S_{xz} & S_{yz}+S_{zy} & -S_{xx}-S_{yy}+S_{zz} \end{bmatrix}$$

Where B is an intermediate matrix used in the calculation of the eigenvectors and eigenvalues.

$$\tilde{A} = \vec{P}_n{}' \cdot \vec{P}_n \tilde{I} - 2\tilde{B} + (\Sigma Y_n{}' \cdot Y_n{}')\tilde{I}$$

Where A is the matrix which is used to calculate the eigenvectors and eigenvalues. The eigenvalues and eigenvectors are then computed from $\tilde{A}$ (step 1152). The rotation quaternion $\vec{q}$ corresponds to the eigenvector with the minimum eigenvalue. The range vector can be calculated by converting the rotation quaternion into a direction cosine matrix $\tilde{D}$ and then using the following equation:

$$\vec{R} = Y_{cg}{}' - \tilde{D}\vec{P}_{cg}{}'$$

Where $\tilde{D}$ is the direction cosine matrix which was computed from the attitude quaternion.

At step 1156, the calculated rotation quaternion can be applied to additional sets of points (i.e., triangles) in the measurement database 240, to verify the identity of the target scene 112 within the field of view 116 of the LADAR system 104, and to verify the pose of the vehicle 108 associated with the LADAR system 104 relative to the identified target scene 112. If the identity of the target scene 112 and pose is verified (step 1160), a pose estimate or solution can be output (step 1164). Moreover, the pose estimate or solution can comprise an orientation and range with respect to the target scene in the LADAR system 104 frame of reference, the model frame of reference, and/or an absolute frame of reference.

Once the position and attitude data are available from a current cycle and previous cycles, estimates of velocity and angular rate can be made calculating back differences on the position and orientation terms. Furthermore, once three estimates of position and orientation are available, the algorithms can use acceleration data to propagate velocity and angular rate data ahead to the vehicle control system's next time step. The pose solution can then be applied to controlling the velocity and position of the vehicle 108 associated with the LADAR system 104 relative to the identified target scene 112.

After outputting a pose solution, or after failing to verify the target identity or pose, or after all available target data have been compared to the model data, a determination may be made as to whether data from a target scene 112 should continue to be obtained (step 1168). If such data gathering is to be continued, the process may return to step 1104, and a next set of LADAR data of the target scene 112 can be obtained. Accordingly, it should be appreciated that a pose solution can be output by a LADAR system 104 in accordance with embodiments of the present invention for each set of three-dimensional LADAR data that is obtained. Alternatively, the process may end.

In examples given above, the locations of points 124 and data points 504 have been defined using x, y, z coordinates. However, as can be appreciated by one of skill in the art, other coordinate systems may be applied. In addition, the data contained in a model database 236 are typically within a first frame of reference, established with respect to the modeled target scene 112. Moreover, the frame of reference applied with respect to data within a model database 236 may comprise an absolute or general frame of reference that can be applied to multiple target scenes 112. The locations of data points 504 contained in the measurement database 240 are generally with respect to a second frame of reference. Moreover, the second frame of reference is with respect to the LADAR system 104, and/or a vehicle 108 associated with the LADAR system 104.

In addition, examples have discussed the use of a LADAR system 104 in accordance with embodiments of the present invention in connection with docking or landing scenarios. However, application of embodiments of the disclosed invention are not so limited. For example, embodiments of the disclosed invention have applicability to any situation in which three-dimensional image information is being compared to data modeling a target scene 112. For example, embodiments of the disclosed invention can be applied in connection with target identification.

A LADAR system 104 in accordance with embodiments of the present invention can be implemented in various ways. For instance, although a particular example of a LADAR system 104 configuration is presented herein, other configurations can be applied, as can be appreciated by one of skill in the art after consideration of the disclosure contained herein. Moreover, although embodiments of the disclosed invention have particular applicability in connection with imaging LADAR, the disclosed processes are operable using location information concerning characteristic indicia or features 120, or data points 504, obtained using any technique or system that provides three-dimensional location information. Moreover, although particular examples of model 236 and measurement 240 databases have been provided, model data concerning target scenes 112 and measurement data obtained from target scenes may be organized in different ways. In addition, although an example of a six DOF least squares fitting technique for calculating a rotation and a translation has been provided, other techniques and equations for determining a rotation and a translation can be used.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for processing three-dimensional data, comprising:
   determining separation distances between a plurality of points in a modeled target scene;
   populating a model database with separation distances between at least three points included in the plurality of points in the modeled target scene;
   obtaining three-dimensional image data from an imaged target scene;
   identifying a plurality of points in the imaged target scene;
   determining through a direct calculation from the obtained three-dimensional image data separation distances between at least three points in the imaged target scene, wherein the at least three points are included in the plurality of points identified in the imaged target scene;
   matching the determined separation distances between the at least three points in the imaged target scene to corresponding separation distances between the at least three points in the model database;
   in response to matching the determined separation distances between the at least three points in the imaged target scene to corresponding separation distances between the at least three points in the model database, transforming a frame of reference of a first one of the separation distances between the at least three points in the imaged target scene and the separation distances in the model database to a frame of reference of a second one of the separation distances between the at least three points in the imaged target scene and the separation distances in the model database.

2. The method of claim 1, wherein the model database includes separation distances between a plurality of sets of points in the modeled target scene, and wherein each set of points in the model database defines a triangle.

3. The method of claim 2, wherein the model database further includes coordinates for the location of the plurality of points in the modeled target scene, wherein the plurality of points in the modeled target scene include the at least three points in the modeled target scene, and wherein the coordinates for the locations of the plurality of points in the model database are with respect to a first frame of reference.

4. The method of claim 3, wherein separation distances between a plurality of sets of points in the imaged target scene are determined from the obtained three-dimensional image data and are placed in a measurement database, and wherein each set of points in the measurement database defines a triangle.

5. The method of claim 4, wherein the measurement database further includes coordinates for the plurality of points in the imaged target scene, and wherein the coordinates for the points in the imaged target scene are with respect to a second frame of reference.

6. The method of claim 5, further comprising:
   sorting the sets of separation distances within the model database according to the total of the separation distances between the points in each set;
   sorting the sets of separation distances within the measurement database according to the total of the separation distances between the points in each set;
   identifying a match between a separation distance within a first set of separation distances in the model database and a separation distance within a first set of separation distances in the measurement database.

7. The method of claim 6, further comprising:
   fitting the data in the model database associated with the first set of separation distances to the data in the measurement database associated with the first set of separation distances in the model database.

8. The method of claim 7, further comprising:
obtaining a rotation quaternion for fitting the data in the model database associated with the first set of separation distances to the data in the measurement database associated with the second set of separation distances.

9. The method of claim 8, further comprising:
outputting a pose solution.

10. The method of claim 8, further comprising:
obtaining a translation value for fitting the first set of separation distances in the model database to the first set of separation distances in the measurement database.

11. The method of claim 10, further comprising:
applying the obtained rotation quaternion and translation value to a second set of separation distances in the measurement database;
identifying a match between the second set of separation distances in the measurement database to a second set of separation distances in the model database.

12. The method of claim 11, further comprising:
applying the obtained rotation quaternion and translation value to a third set of separation distances in the measurement database;
identifying a match between the third set of separation distances in the measurement database to a third set of separation distances in the model database.

13. The method of claim 2, wherein the separation distances populating the model database are obtained a priori.

14. A pose estimation system, comprising:
a LADAR system;
memory, including:
  a model database, wherein model data in the model database includes location information for a plurality of points in a modeled target scene, wherein the data includes location information organized as sets of at least three points included in the plurality of points in the modeled target scene; and
  a measurement database, wherein measurement data in the measurement database is collected by the LADAR system, and wherein the measurement data includes location information for a plurality of points in an imaged target scene;
a processor, wherein the processor is operable to compare data collected by the LADAR system to data included in the model database, wherein separation distances between at least three points in the model data are compared to separation distances between at least three points in the measurement data, wherein following a match between compared separation distances a rotation quaternion and a translation vector are calculated mapping at least one of the measurement data into the reference frame of the model data or the model data into the reference frame of the measurement data, wherein following the mapping a separation distance between at least a fourth point in the model data that is different from the at least three points in the model data and one of the at least three points in the model data is compared to a separation distance between at least a fourth point in the measurement data and one of the at least three points in the measurement data, wherein following a match of the separation distance between the at least fourth points and one of the at least three points in the model data and the measurement data a pose solution is calculated.

15. The system of claim 14, further comprising an output device, wherein the determined pose solution is output.

16. A method for determining a pose solution, comprising:
obtaining three-dimensional image information from a target scene;
identifying a plurality of points within the image information;
determining a location of each of the plurality of points;
determining separation distances between the plurality of points;
placing the separation distances in a measurement database, wherein the distances between sets of three points define a triangle;
comparing the separation distances in the measurement database to separation distances in a model database;
in response to identifying a match, transforming a frame of reference of a first one of the separation distances in the measurement database and the separation distances in the model database to a frame of reference of a second one of the separation distances in the measurement database and the separation distances in the model database.

17. The method of claim 16, wherein transforming a frame of reference includes calculating an eigenvalue and an eigenvector from matrix values.

18. The method of claim 17, wherein the image information is obtained by a LADAR system associated with a vehicle, the method further comprising:
outputting a pose solution between the vehicle and an identified target scene.

* * * * *